United States Patent Office 3,083,182
Patented Mar. 26, 1963

3,083,182
PROCESS FOR THE CATALYTIC PRODUCTION OF POLYCARBONATES WITH MANGANESE SALT CATALYSTS
Mikio Matsukane and Jiro Yamamoto, Mihara-shi, Hiroshima-ken, Japan, assignors to Kunoshima Kagaku Kogyo Kabushiki Kaisha, Hiroshima-ken, Japan, a corporation of Japan
No Drawing. Filed Sept. 11, 1959, Ser. No. 839,305
Claims priority, application Japan Sept. 29, 1958
6 Claims. (Cl. 260—47)

This invention relates to a process for producing carbonate polymers, more in particular to an improved process for the production of polycarbonates from 4,4'-dihydroxy-diaryl-alkanes and diaryl carbonates by the ester-interchange reaction.

A primary object of this invention is to provide a rapid process for the production of polycarbonates that are light in color and moreover of a high degree of polymerization.

Another object of the invention is to provide excellent catalysts or accelerators for use in the ester-interchange reaction for producing polycarbonates.

Other objects and advantages of this invention will become apparent from the explanation given hereinafter.

Heretofore, to produce the polycarbonates themselves from 4,4'-dihydroxy-diaryl-alkanes and diaryl carbonates by the ester-interchange reaction has been known. In this case, as 4,4'-dihydroxy-diaryl-alkanes, for example, there can be cited 4,4'-dihydroxy-diphenyl-methane, 2,2-(4,4'-dihydroxy - diphenyl) - propane, 1,1 - (4,4'-dihydroxy-diphenyl) - cyclohexane, 1,1-(4,4'-dihydroxy-3,3'-dimethyl-diphenyl)-cyclohexane, 1,1-(2,2'-dihydroxy-4,4'-dimethyl-diphenyl) - butane, 2,2-(2,2'-dihydroxy-4,4'-di-tert.-butyl-diphenyl) - propane, 1,1-(4,4' - dihydroxy - diphenyl)-1-phenyl-ethane, 2,2-(4,4'-dihydroxy-diphenyl)-butane, 2,2-(4,4'-dihydroxy-diphenyl) - pentane, 2,2-(4,4'-dihydroxy-diphenyl)-hexane, 3,3-(4,4'-dihydroxy-diphenyl)-hexane, 2,2-(4,4-dihydroxy-diphenyl)-4-methyl-pentane, 2,2-(4,4'-dihydroxy - diphenyl) - heptane, 4,4 - (4,4'-dihydroxy-diphenyl)-heptane, 2,2-(4,4'-dihydroxy-diphenyl)-propane, 2,2-(4,4'-dihydroxy-3-methyl-3'-iso - propyl - diphenyl)-butane, 2,2-(3,5,3',5'-tetrachloro-4,4'-dihydroxy - diphenyl)-propane, 2,2-(3,5,3',5' - tetrabromo - 4,4' - dihydroxy-diphenyl)-propane, (3,3'-dichloro-4,4'-dihydroxy-diphenyl)-methane, (2,2'-dihydroxy-5,5'-di - fluoro - diphenyl)-methane, (4,4'-dihydroxy-diphenyl)-phenyl-methane and 1,1-(4,4'-dihydroxy-diphenyl)-1-phenyl-ethane, etc.; and as diaryl carbonates, there can be cited diphenyl carbonate, dicresyl carbonate, dinaphthyl carbonate, etc.

The process as above described for producing polycarbonates from 4,4'-dihydroxy-diaryl-alkanes and diaryl carbonates by the ester-interchange reaction will be described in further detail taking as an example, for convenience sake, the ester-interchange reaction of a 4,4'-dihydroxy-diphenyl-alkane and carbonic acid diester of phenol.

While a 4,4'-dihydroxy-diphenyl-alkane and carbonic acid diester of phenol slightly in excess of the stoichiometrical quantity are used, and a pre-condensation polymer is obtained by first separating 80–90% of the theoretical amount of phenol formed by the ester-interchange reaction, at this reaction stage, in order to maintain a reaction temperature at which the ester-interchange takes place rapidly while avoiding the distillation off of the carbonic acid diester and to remove phenol expeditiously, the pressure must be reduced to a certain degree. In general, as conditions of the condensation a temperature of about 160 to 220° C., usually about 190° C., and a reduced pressure of normally about 50 mm. Hg to 15 mm. Hg may be used.

Then the condensation product is heated under a high vacuum condition to cause the reaction to proceed further and the degree of polymerization is gradually enhanced as the separated phenol and the excess carbonic acid diester are distilled off. The reaction temperature at this stage is above the melting point of the formed polycarbonate, i.e., a temperature of about 220 to 290° C. being usual. In order to distill off minute quantities of phenol and unreacted materials, the pressure must be reduced to 1 mm. Hg to 0.1 mm. Hg or below. Further, all of the above-described process is usually performed in an atmosphere of inert gas such as nitrogen to preclude the undesirable decomposition of the starting materials and the product under high temperatures.

While in general polycarbonates possess fundamentally various excellent properties as materials for film manufacture and other shaped articles, when they are processed into films and various other shaped articles, the degree of polymerization of the polycarbonates must be higher than a certain degree so that the products may have adequate physical properties. The articles made of polycarbonates having a low degree of polymerization are very brittle and their impact strength is also low. The manufacture of films would also be difficult in this case. In preparing polycarbonates, no matter how pure the starting materials, i.e., 4,4'-dihydroxy-diaryl-alkanes and carbonic acid diesters of aromatic hydroxy compounds, may be, by merely mixing both and heating them under reduced pressures will not result in the adequate accomplishment of the above-mentioned ester-interchange reaction, it being only possible to obtain polymers with a very low degree of polymerization and moreover with excessive coloration.

Therefore, in the production of polycarbonates, a suitable catalyst for the ester-interchange reaction becomes necessary. As such a catalyst, while a number of metallic compounds are already known such as alkaline metals and their alcoholates, oxides and hydrides of alkaline earth metals, zinc oxide, lead oxide, antimony trioxide and the like, most of these heretofore known catalysts are not necessarily satisfactory when considered from the standpoint of such as their rate of polymerization, the degree of polymerization and color of the polymers obtained, etc.

As a result of our intensive research into these catalysts for use in the ester-interchange reaction, we found that manganese compounds of the group consisting essentially of the manganese salts of organic or inorganic acids had excellent catalytic activity and that by their use a polymer having a lighter color and a higher degree of polymerization that was hardly obtainable by conventional catalysts could be obtained and that the polymerization time could also be reduced. The above manganese compounds of this invention consists essentially of the manganese salts of organic and inorganic acids, which may be any organic or inorganic acids such as the monobasic aliphatic acids having from 1 to 10 carbon atoms such as formic acid, acetic acid, propionic acid, butyric acid, valeric acid, caproic acid, etc.; dibasic aliphatic acids having 2 to 10 carbon atoms such as oxalic acid, malonic acid, succinic acid, glutaric acid, adipic acid, pimelic acid, suberic acid, sebacic acid, etc.; aliphatic oxycarboxylic acids such as lactic acid, $\alpha$-oxyisobutyric acid, citric acid, tartaric acid, etc.; aromatic acids such as benzoic acid, phthalic acid, terephthalic acid, etc.; aromatic oxycarboxylic acids such as ortho-oxybenzoic acid, meta-oxybenzoic acid, para-oxybenzoic acid, etc.; and boric acid and carbonic acid.

The foregoing manganese compounds such as the manganese salts of organic and inorganic acids are very excellent as catalysts for use in the production of polycarbonates by the ester-interchange reaction. Since the presence of a small amount of these manganese salts in accordance with this invention makes the early stages of the ester-interchange reaction proceed rapidly, the rate at which phenols are distilled off is speeded up and the reaction of the subsequent stages being also made to progress very rapidly, polycarbonates of a high degree of polymerization are easily obtained. In this case, while the ester-interchange catalytic activity is fully manifested by the use of these manganese compounds singly, if necessary, these may be mixed together and used or they may be combined with other ester-interchange catalysts consisting of the known metallic compounds. Furthermore, although the manganese compound catalysts in accordance with this invention may be used in a considerably wide range of concentrations such as 0.001–2.0% by weight based on the amount of the 4,4'-dihydroxy-diaryl-alkanes, it is preferable that the catalyst used be within the range from 0.01 to 0.5% by weight, this being equally applicable when two or more kinds of manganese compounds are used. When the manganese compounds of this invention are to be used together with the other known metallic compounds, the amount of the manganese compounds used is preferably within the range as above indicated and that of the known metallic compound catalysts should suitably be about the same amount as the manganese compound or less.

Polycarbonates prepared by the use of a manganese compound as catalyst in accordance with this invention are light in color and transparent. The invention is characterized in that excellent linear polymers of high polymerization degree are obtained, since the aforesaid manganese compound catalysts do not cause changes of the polymer into cross-linked structures by such as splitting of molecular bonds or rearrangement reactions at high temperatures.

While the fact that the manganese compounds in accordance with this invention possess excellent catalytic activity is quite apparent from what has been described hereinabove, the invention will be further illustrated by the following examples. It is to be understood, however, that these examples are only used for purposes of illustration and are not to be construed as limiting the scope of the invention. The "part" in the examples all indicate part by weight.

$[\eta]$ represents intrinsic viscosity and is determined as follows:

$$[\eta] = \lim_{C \to 0} \frac{\eta r - 1}{C}$$

where $\eta r$ indicates the ratio of the viscosity of a diluted polycarbonate solution in methylene chloride to that of methylene chloride alone; C shows a concentration of the diluted solution, being represented by the number of grams of polycarbonates in 1 liter of the solution.

Example 1

A mixture of 45.6 parts of 2,2-(4,4'-dihydroxy-diphenyl)-propane, 47.0 parts of diphenyl carbonate, and 0.08 part of manganese acetate was heated at 185° C. in a nitrogen atmosphere and the pressure was reduced to 50 mm. Hg. Immediately phenol began to distill off. When the rate at which phenol distilled off decreased, it was increased again by raising the temperature to 205° C. Then the pressure was reduced further to 15 mm. Hg to cause the free phenol separated in this initial stage to distill off thoroughly. This initial stage ester-interchange reaction was completed in about 3.5 hours. Thereafter the pressure of the reaction vessel was reduced to 1 mm. Hg, and while maintaining this vacuum the temperature was gradually raised; the reaction was made to proceed for half an hour at 225° C., two hours at 255° C., and finally an hour at 285° C. A very tough condensed polymer with a slight yellowish brown tinge was obtained whose $[\eta]$ was 0.082.

Example 2

A closed reaction vessel equipped with a stirrer and capable of being heated with an oil bath was charged with 68.4 parts of 2,2-(4,4'-dihydroxy-diphenyl)-propane, 70.5 parts of diphenyl carbonate and 0.12 part of manganese borate and then heated to 185° C. in an atmosphere of nitrogen. When the pressure of the reaction vessel was held at 50 mm. Hg and the reaction was carried out, a greater part of the calculated phenol formed was distilled off. Then when the temperature was raised to 205° C. and the reaction continued while maintaining a pressure of 1 mm. Hg, the reaction mixture become gradually viscous. To complete this initial ester-interchange reaction stage, about four hours was required. Thereafter the reaction was continued for half an hour at 225° C., two hours at 255° C. and then an hour at 285° C. under the same pressure. The polycarbonate thus obtained was of a slightly yellowish tinge whose $[\eta]$ was 0.055.

Example 3

A mixture of 91.2 parts of 2,2-(4,4'-dihydroxy-diphenyl)-propane, 102.7 parts of diphenyl carbonate, and 0.16 part of manganese carbonate was reacted in a manner similar to Example 1 and a polycarbonate with a slightly yellowish brown tinge whose $[\eta]$ was 0.050 was obtained.

Incidentally, the polycarbonate obtained under similar reaction conditions as in the above example without however using any catalyst at all exhibited a dark reddish brown color and had an $[\eta]$ of 0.023.

Example 4

A mixture of 45.6 parts of 2,2-(4,4'-dihydroxy-diphenyl)-propane, 47.0 parts of diphenyl carbonate, and 0.08 part of manganese formate was reacted in a manner exactly as in Example 1, and a light yellow polycarbonate was obtained whose $[\eta]$ was 0.074.

Example 5

A mixture of 114.0 parts of 2,2-(4,4'-dihydroxy-diphenyl)-propane, 123.0 parts of diphenyl carbonate, and 0.20 part of manganese oxalate was heated to 190° C. in an atmosphere of nitrogen and the pressure was reduced to 25 mm. Hg. Immediately phenol began to distill off. When the rate at which phenol distills off decreased, the temperature was increased to 220° C. and phenol started to distill off again. The pressure was reduced further to 10 mm. Hg to cause the free phenol separated in the initial stage to distill off thoroughly. This initial ester-interchange reaction stage was completed in about three hours. Then the pressure of the reaction vessel was reduced to 1 mm. Hg, and while maintaining this vacuum the temperature was gradually raised. Thereafter the reaction was made to proceed for two hours at 250° C. and then an hour at 285° C. This was followed by further continuing the reaction for two hours at this temperature while maintaining a pressure of 0.5 mm. Hg. The resultant polycarbonate had a slightly yellowish brown tinge and was very tough with its $[\eta]$ being 0.068.

Example 6

114 parts of 2,2-(4,4'-dihydroxy-diphenyl)-propane, 123.0 parts of diphenyl carbonate, and 0.20 parts of manganese succinate were reacted in a manner similar to Example 4, and a polycarbonate whose $[\eta]$ was 0.073 was obtained.

Example 7

114.0 parts of 2,2-(4,4'-dihydroxy-diphenyl)-propane, 118.0 parts of diphenyl carbonate, and 0.18 part of manganese lactate were reacted in a manner exactly similar to Example 1, and a light brown polycarbonate whose $[\eta]$ was 0.058 was obtained.

Example 8

A mixture of 114.0 parts of 2,2-(4,4'-dihydroxy-diphenyl)-propane, 117.5 parts of diphenyl carbonate, and 0.15 part of manganese benzoate was heated to 215–220° C. in an atmosphere of nitrogen, and upon reduction of the pressure to 30 mm. Hg, phenol began to distill off. When the rate at which phenol distilled off decreased, the pressure was reduced to 15 mm. Hg and the free phenol separated in the initial stage was thoroughly distilled off. This initial ester-interchange reaction stage was completed in about 2.5 hours. When the pressure was then reduced to 1 mm. Hg and the reaction was carried out for half an hour at 230° C. the reaction mixture became very viscous. When this was further reacted for two hours at 290° C. while the pressure was held at 0.5 mm. Hg, a polycarbonate with a slightly yellowish tinge was obtained whose $[\eta]$ was 0.072.

Example 9

114.0 parts of 2,2-(4,4'-dihydroxy-diphenyl)propane, 117.5 parts of diphenyl carbonate, and 0.18 part of manganese salicylate were reacted in a manner similar to Example 8, and a polycarbonate whose $[\eta]$ was 0.066 was obtained.

Example 10

48.5 parts of 2,2-(4,4'-dihydroxy-diphenyl)-butane, 47 parts of diphenyl carbonate, and 0.08 part of manganese borate were reacted in a manner similar to Example 2, and a light yellow, easily moldable thermoplastic resin which melted at 205–210° C. was obtained.

Example 11

The reaction was carried out in a manner similar to Example 2 except that 53.3 parts of dimetacresyl carbonate whose boiling point is 216–217° C./31 mm. Hg and melting point is 49.0–49.5° C. was used in lieu of diphenyl carbonate. The polycarbonate obtained had a slightly brownish tinge and its $[\eta]$ was 0.054.

Example 12

A mixture of 45.6 parts of 2,2-(4,4'-dihydroxydiphenyl)-propane, 47.0 parts of diphenyl carbonate, 0.04 part of manganese acetate, and 0.04 part of manganese borate was heated to 215° C. in an atmosphere of nitrogen, and when the pressure was reduced to 28 mm. Hg, phenol began to distill off. About 90 minutes later, since the phenol distilled off decreased, the pressure was reduced to 15 mm. Hg and the temperature was raised to 225° C., which resulted 30 minutes later in hardly any free phenol being distilled off. Then when the pressure was reduced to 1 mm. Hg and the reaction was continued for 90 minutes at 285–295° C., the diphenyl carbonate was also removed by distillation and the reaction mixture became very viscous. The polycarbonate thus obtained had an $[\eta]$ of 0.059 and was a tough resin of light yellowish brown color.

Example 13

91.2 parts of 2,2-(4,4'-dihydroxy-diphenyl)-propane, 94.0 parts of diphenyl carbonate, 0.08 part of manganese borate, and 0.04 part of antimony trioxide were heated in an atmosphere of nitrogen after reducing the pressure to 30 mm. Hg. Upon reaching 205° C. phenol began to distill off. While maintaining this reduced pressure, the temperature was raised to 240° C. in an hour. Then the pressure was reduced to 15 mm. Hg and the reaction was carried out for an hour. Phenol formed in the meantime was practically all distilled off. This was followed by reduction of the pressure to 1 mm. Hg, raising the temperature to 290° C. in an hour, and continuance of the reaction under these conditions for four hours. The resultant polycarbonate had an $[\eta]$ of 0.049.

Although in the above-described examples, 2,2-(4,4'-dihydroxy-diphenyl)-propane and 2,2-(4,4'-dihydroxy-diphenyl)-butane have been used as the 4,4'-dihydroxy-diaryl-alkanes, and diphenyl carbonate and dimetacresyl carbonate have been used as the diaryl carbonates, in accordance with this invention, polycarbonates may be produced in a manner similar to the above examples from 4,4'-dihydroxy-diphenyl-alkanes and diaryl carbonates other than those illustrated in the above examples by using the aforesaid manganese compound catalysts.

From the disclosures and examples given hereinabove, it is evident that the manganese compounds of this invention consisting of essentially the manganese salts possess very excellent properties as ester-interchange catalysts for the production of polycarbonates.

Since it is apparent that many changes and modifications can be made in the above-described details without departing from the nature and spirit of the invention, it is to be understood that the invention is not to be limited thereto except as set forth in the appended claims.

What is claimed is:

1. A process for producing polycarbonate which comprises reacting at least one 4,4'-dihydroxy-diaryl-alkane in which both of the hydroxy-aryl groups are attached to the same carbon atom of the alkane with at least one diaryl carbonate in the presence of at least one manganese compound selected from the group consisting of manganese salts of organic acids, boric acid, and carbonic acid, said reaction being carried out at a temperature of at least 160° C. under a pressure of less than 50 mm. Hg, the amount of said diaryl carbonate being at least 1 mol with respect to 1 mol of said 4,4'-dihydroxy-diaryl-alkane and the amount of said manganese compound being 0.001–2.0% by weight of said 4,4'-dihydroxy-diaryl-alkane.

2. A process according to claim 1 wherein the manganese compound is at least one compound selected from the group consisting of the manganese salts of organic acids selected from the group consisting of monobasic aliphatic acids having from one to ten carbon atoms, dibasic aliphatic acids having from two to ten carbon atoms, aliphatic oxycarboxylic acids and aromatic oxycarboxylic acids, and of inorganic acids selected from the group consisting of boric acid and carbonic acid.

3. A process according to claim 1 wherein the manganese compounds are combined with metal compounds selected from the group consisting of alkali metals, alkali metal alcoholates, oxides of alkaline earth metals, hydrides of alkaline earth metals, zinc oxide, lead oxide and antimony trioxide and used as the catalyst.

4. A process according to claim 1 wherein manganese compounds are added in an amount of 0.001–2.0% by weight, particularly 0.01–0.5% by weight, based upon the amount of 4,4'-dihydroxy-diphenyl-alkanes.

5. A process according to claim 2 wherein manganese compounds are added in an amount of 0.001–2.0% by weight, particularly 0.01–0.5% by weight, based upon the amount of the 4,4'-dihydroxy-diphenyl-alkanes.

6. A process according to claim 3 wherein the mixture of manganese compound and metal compound catalysts other than the former are added as manganese compounds in an amount of 0.001–2.0% by weight, particularly 0.01–0.5% by weight, based upon the amount of the 4,4'-dihydroxy-diphenyl-alkanes.

References Cited in the file of this patent

UNITED STATES PATENTS

| | | |
|---|---|---|
| 2,578,660 | Auspos et al. | Dec. 18, 1951 |
| 2,850,483 | Ballentine et al. | Sept. 2, 1958 |
| 2,950,266 | Goldblum | Aug. 23, 1960 |

FOREIGN PATENTS

| | | |
|---|---|---|
| 772,627 | Great Britain | Apr. 17, 1957 |
| 791,790 | Great Britain | Mar. 12, 1958 |